United States Patent
Koizumi et al.

(10) Patent No.: US 7,572,981 B2
(45) Date of Patent: Aug. 11, 2009

(54) PARKED AIRCRAFT POWER CABLE PROTECTION SYSTEM AND METHOD

(75) Inventors: Scott Takayuki Koizumi, Fairfield, CA (US); Brian Michael Piety, Vacaville, CA (US); Folkert Fred Koch, San Ramon, CA (US); Wolfgang Ott, Antioch, CA (US); Dale Arnold Miller, Vacaville, CA (US); Denise Marie Frazier, Pleasant Hill, CA (US); Mark David Resendes, Dixon, CA (US)

(73) Assignee: Illinois Tool Works Inc., Glenview, IL (US)

( * ) Notice: Subject to any disclaimer, the term of this patent is extended or adjusted under 35 U.S.C. 154(b) by 692 days.

(21) Appl. No.: 11/227,330

(22) Filed: Sep. 14, 2005

(65) Prior Publication Data
US 2007/0056761 A1 Mar. 15, 2007

(51) Int. Cl.
*H01B 7/00* (2006.01)
(52) U.S. Cl. .................................... 174/111
(58) Field of Classification Search .............. 174/111, 174/92
See application file for complete search history.

(56) References Cited

U.S. PATENT DOCUMENTS

| | | | |
|---|---|---|---|
| 3,913,187 A | 10/1975 | Okuda | |
| 4,637,097 A | 1/1987 | Secord | |
| 4,843,356 A * | 6/1989 | Lusignan et al. | 333/236 |
| 5,003,278 A * | 3/1991 | May | 336/92 |
| 5,115,586 A | 5/1992 | Hawker | |
| 5,389,736 A | 2/1995 | Ziemek et al. | |
| 5,547,153 A | 8/1996 | Larsen et al. | |
| 6,152,185 A | 11/2000 | Tucker | |
| 6,633,000 B2 * | 10/2003 | Kuo | 174/92 |
| 2004/0011918 A1 * | 1/2004 | Musial et al. | 244/1 R |

FOREIGN PATENT DOCUMENTS

| | | |
|---|---|---|
| GB | 1 327 659 | 8/1973 |
| GB | 1 437 405 | 5/1976 |
| GB | 1 538 453 | 1/1979 |

* cited by examiner

*Primary Examiner*—Chau N Nguyen
(74) *Attorney, Agent, or Firm*—Fletcher Yoder

(57) ABSTRACT

A power delivery system for parked aircraft includes protective rings on the power cords. These protective rings protect the power cord jackets from wear and facilitate movement of the power cords across the ground. The rings may be configured for securement to the cable so as to compress the insulative jacket of the cable somewhat, thereby firmly maintaining the rings in place on the cable. The rings may be formed of two identical elements that are joined to envelope the cable. The rings may accommodate both round insulated cable, as well as bundled cable.

25 Claims, 5 Drawing Sheets

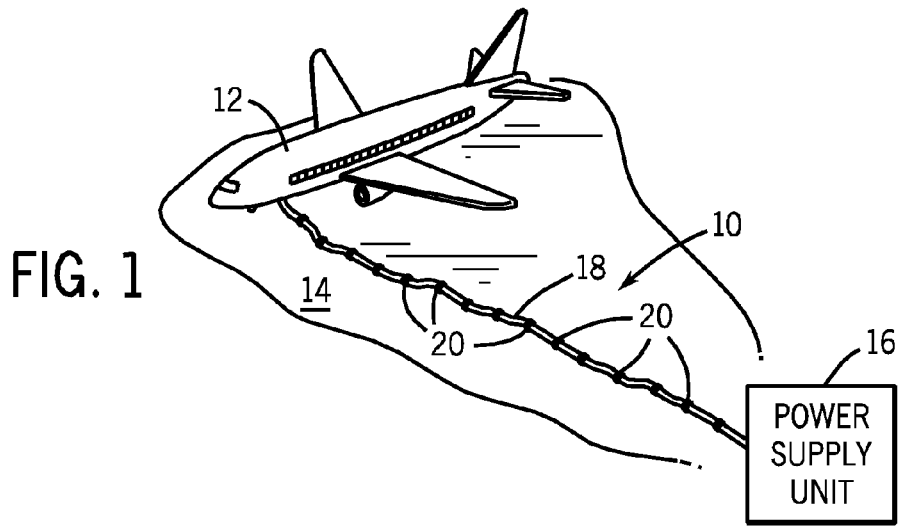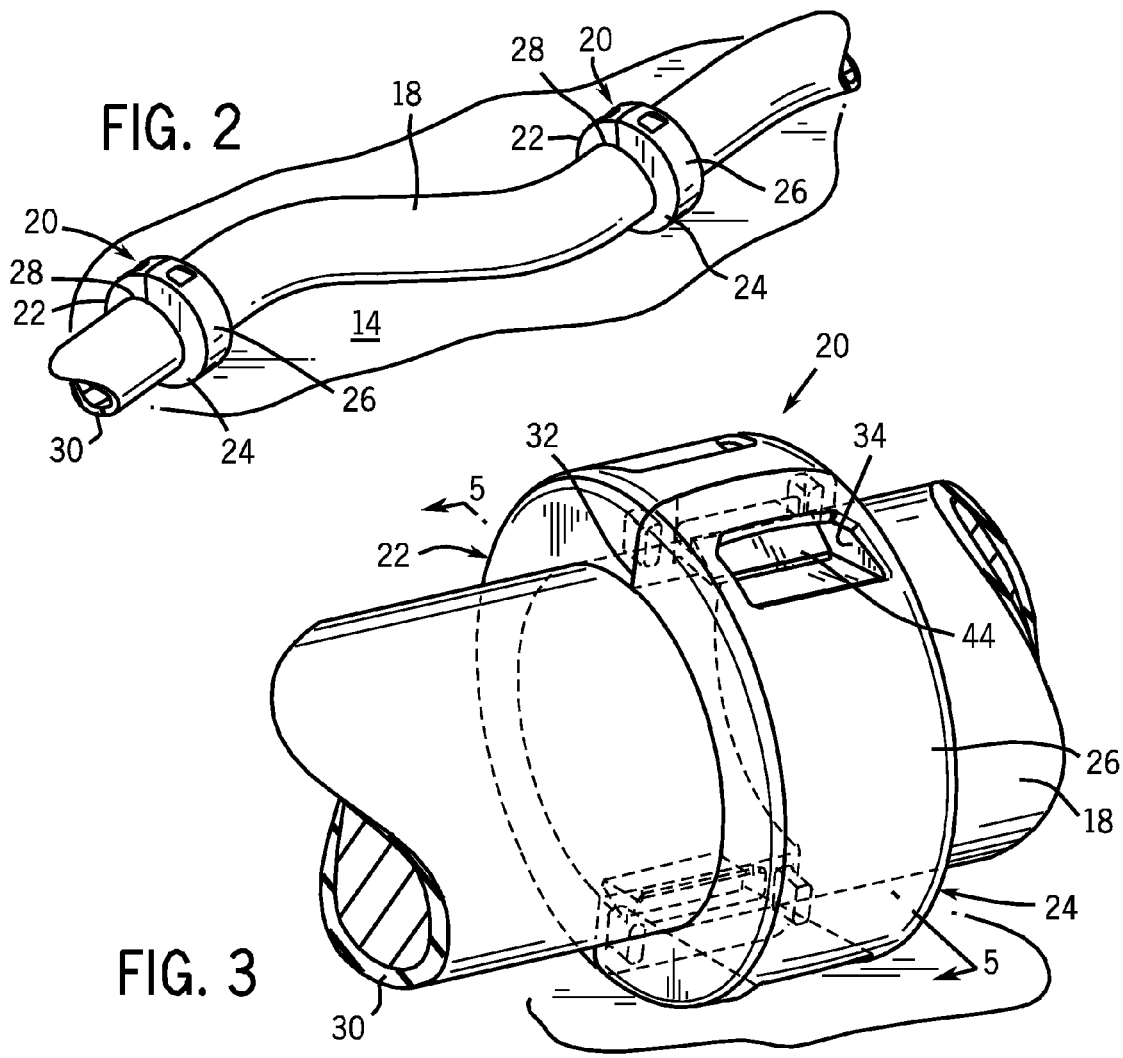

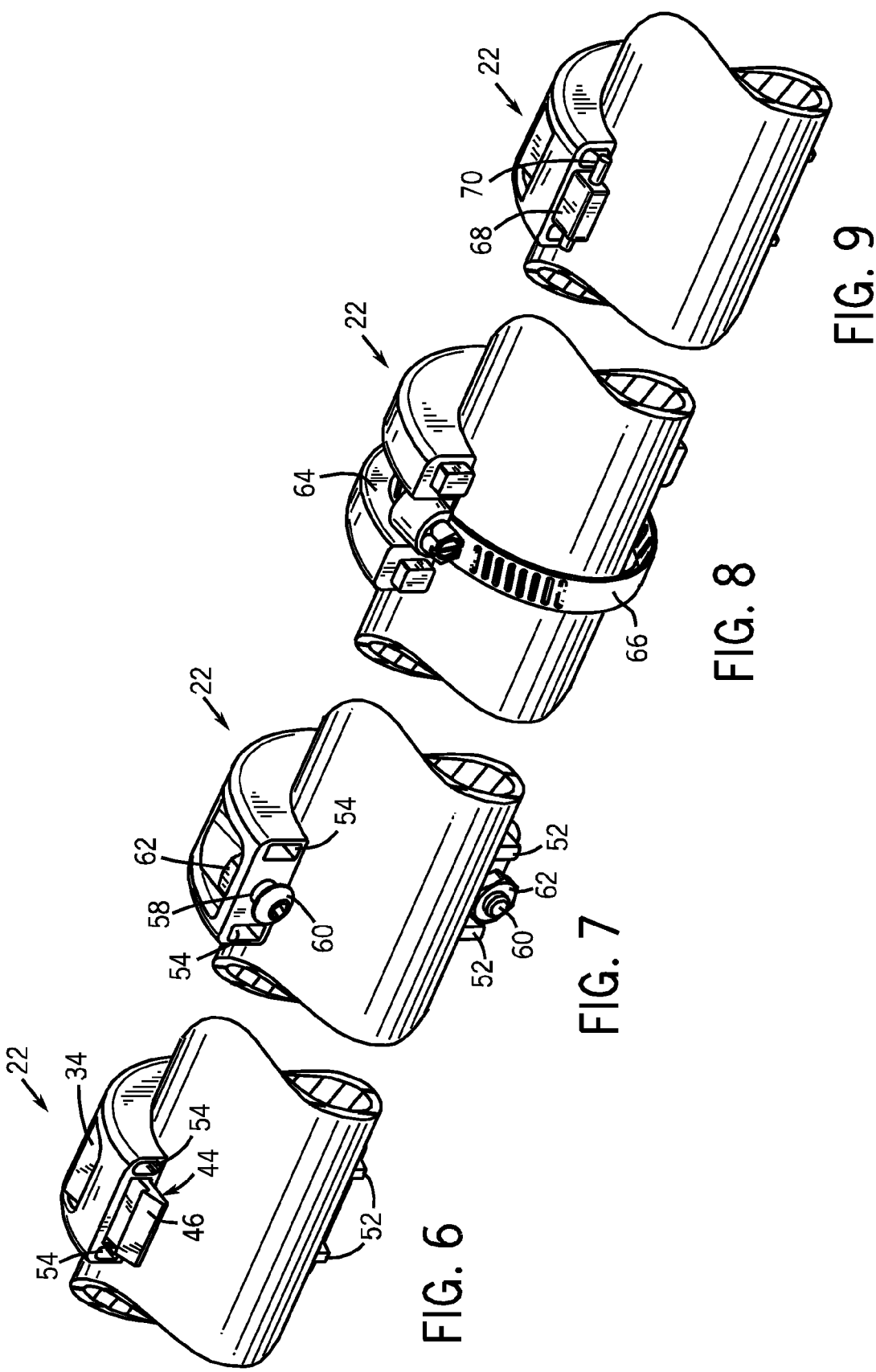

PARKED AIRCRAFT POWER CABLE PROTECTION SYSTEM AND METHOD

BACKGROUND

This invention relates generally to aircraft power delivery systems. More particularly, the invention relates to a technique for protecting cables and cable assemblies, and for facilitating movement of such cables across pavement at a terminal or other location at which aircraft may be parked.

Most aircraft have multiple power delivery systems which are used during different periods of operation. That is, electrical systems of an aircraft that is flying or taxiing on a runway are powered by an auxiliary power unit (APU) which typically includes an internal engine coupled to a generator or alternator, much as in a car. On the other hand, an aircraft that is parked is generally powered by an external power source. These external sources can be mobile generator systems or power units built into a terminal, passenger boarding bridge, or hangar.

To supply power to a parked aircraft from an external power source, the aircraft must essentially be plugged into the power unit. As with most devices that must be plugged in for power, the aircraft is connected to the power supply unit via a power cord or cable. The cable or cable assembly is generally selected based upon the voltage and current requirements. By way of example, an industry standard has been developed for certain aircraft power cables to supply power at a rated 260 amps and 400 Hz.

As can be expected, power cords used to plug in an aircraft are significantly larger than a standard household power cable. For example, these cables can have outer diameters on the order of 1 to 2 inches. Alternatively, some of these power cords can actually include several smaller cables bundled together. In addition, because the aircraft cannot always be brought into close proximity with the external power supply units, some cables must be quite long. In the case of commercial aircraft, these cables generally must stretch from a loading gate, or other location where the plane is parked, across the tarmac to the terminal building, where the power supply unit is located, or to a mobile power supply.

It can be appreciated that these cables, due to their length and thickness, are often quite heavy. For example, a 260 amp, 400 Hz cable of the type mentioned above, that is 60 feet long, can weigh in excess of 130 pounds. Operators must move these cables across the paved surfaces of the tarmac and runways to stretch the cables from the power supply units to the aircraft. Dragging a long, heavy cable across paved surfaces can be quite difficult and inevitably leads to wear and degradation of the cable insulating jacket.

One solution to facilitate movement of the cables across paved surfaces has been to coat the cables with a slick insulating jacket. This slick coating enables the cables to slide more easily across the tarmac and runways. However, this solution does not address the problem of wear on the cables, and over time degradation of the slick insulating jacket makes even these cables very difficult to maneuver.

Therefore, it would be advantageous to have a system that allows for easy maneuverability of aircraft power cables across paved surfaces while also protecting the insulating jackets of the cables from wear.

BRIEF DESCRIPTION

In accordance with an exemplary embodiment of the present invention, protective rings are coupled to a cable assembly for supplying power to a parked aircraft. The rings are designed to facilitate movement of the cable assembly across the ground. As such, the rings are compressively secured to the cable assembly such that each ring remains at roughly its original location relative to the cable assembly. Each ring may be made of two generally identical halves, thereby reducing set-up and production time and cost. The ring halves are secured together by a locking mechanism, several embodiments of which are described below.

In accordance with an additional embodiment of the present invention, the protective rings are configured to be coupled to a bundled cable assembly. This type of cable assembly is an alternative to the single cable assembly.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical view of an aircraft connected to a power supply unit via a power cable assembly with protective rings, according to an embodiment of the present invention;

FIG. 2 is a perspective view of a power cable assembly with rings of the type shown in FIG. 1;

FIG. 3 is a somewhat more detailed perspective view of the power cable assembly of FIG. 2;

FIG. 6 is a perspective view of a power cable assembly and one segment of a protective ring according to an embodiment of the present invention;

FIG. 7 is a perspective view of a power cable assembly and segment of an alternative protective ring design;

FIG. 8 is a perspective view of a power cable assembly and segment of another alternative protective ring design;

FIG. 9 is a perspective view of a power cable assembly and segment of a further alternative protective ring design;

DETAILED DESCRIPTION

Figure 4:
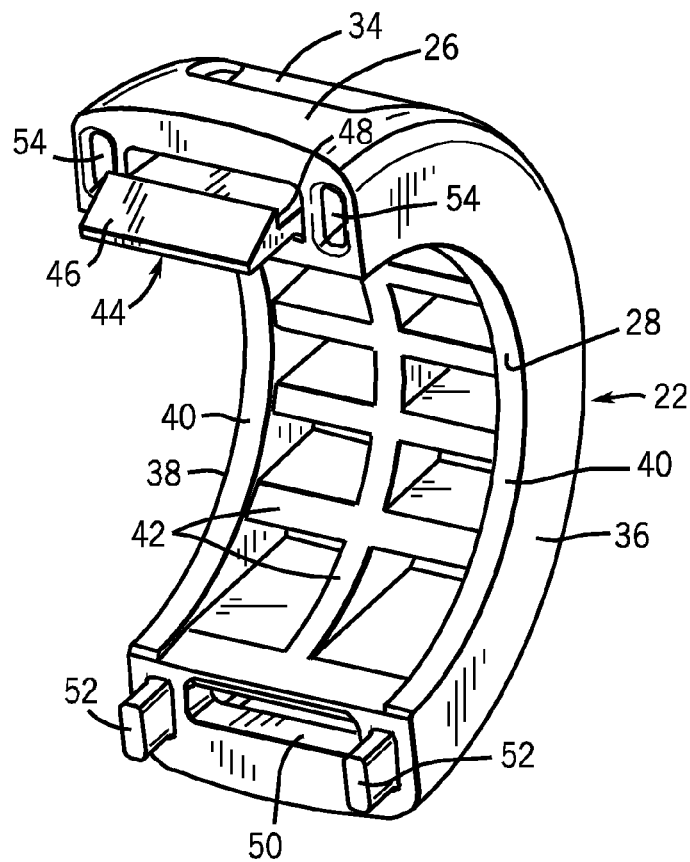
FIG. 4 is a perspective view of one segment of the ring in FIG. 3.

Referring generally to FIG. 1, a parked aircraft power delivery system is illustrated, generally designated by the reference numeral 10. An aircraft 12, which may be a commercial, military or private aircraft, is illustrated as it may be parked on the ground 14, such as at a terminal or other facility. Ground 14 is generally a tarmac, runway or hangar floor, but could be any surface on which an aircraft is parked. The aircraft 12 is connected to a power supply unit 16 by a cable assembly 18. As will be appreciated by those skilled in the art, the power supply unit 16 may be a mobile unit (e.g., an engine-driven generator set), or may be fixed in position (e.g., drawing power from the grid). In either case, the cable assembly 18 delivers power for operation of various systems of the aircraft to alleviate the need to draw upon the onboard power generation resources of the aircraft itself.

Cable assembly 18 must be moved out of the way of aircraft 12 when aircraft 12 is in motion, such as when it taxies to and from a terminal. When aircraft 12 is parked, cable assembly 18 is moved into proximity and plugged into aircraft 12, thus completing an electrical connection between the power supply unit 16 and aircraft 12. Before aircraft 12 begins moving, cable assembly 18 is unplugged from aircraft 12 and moved away so that it is not in the path of aircraft 12 or so that it can be used to couple power supply unit 16 to another aircraft. As discussed above, a standard 260 amp, 400 Hz cable assembly with an outer diameter of 1.65 inches can weigh over 130 pounds, and cable assemblies can be longer and/or thicker than this standard.

Figure 5:
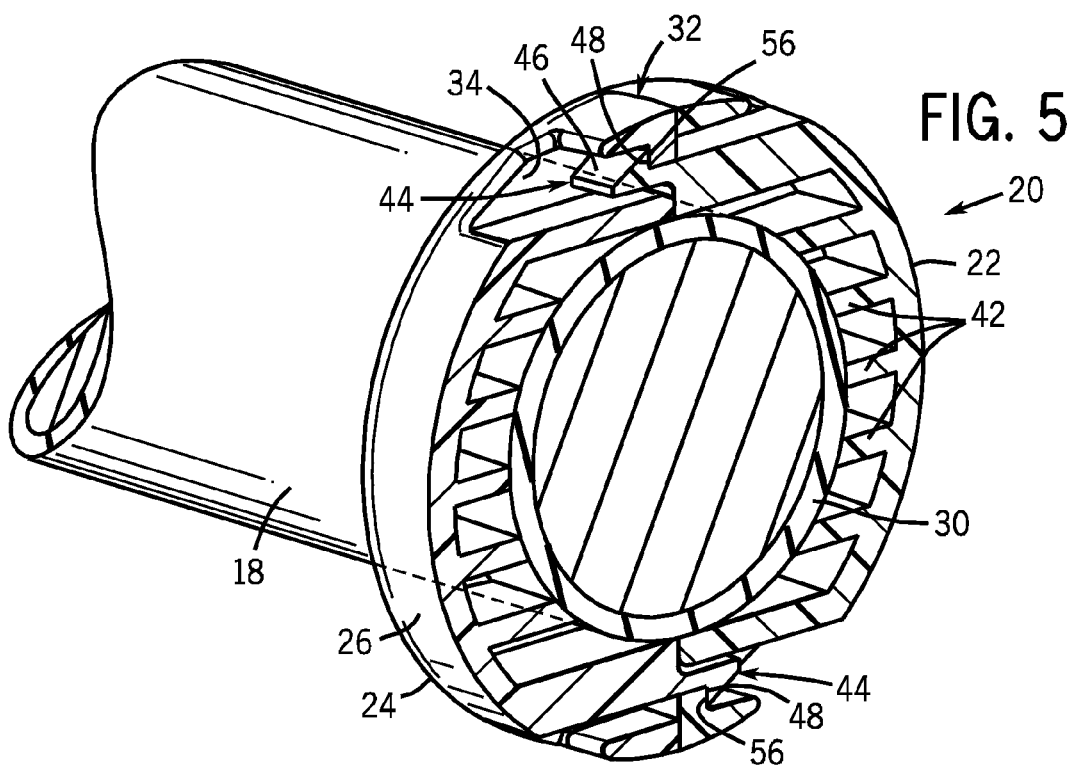
FIG. 5 is a cross-sectional view of the ring in FIG. 3, taken along line 5-5.

Protective rings 20 are coupled to the cable assembly 18 to facilitate moving the cable assembly across the ground, such as by sliding. The rings also prevent or reduce wear on the cable due to abrasion by the ground surface. In the implementation shown in FIG. 1, the rings are spaced at 1 to 2 foot intervals along the cable assembly, although other spacings may be used. Exemplary embodiments of protective rings 20 are illustrated in FIGS. 4 and 5 and discussed below. In addition, alternative embodiments of protective rings 20 are illustrated in FIGS. 6-11.

As further illustrated in FIGS. 2 and 3, protective rings 20 are coupled to a segment of cable assembly 18. In the illustrated embodiment, each protective ring 20 is made up of a first half 22 and a second half 24. The outer periphery 26 of each ring is configured to bear against a support surface, such as the ground 14, and to slide along the ground 14 during movement of the cable assembly by service personnel. As described in greater detail below, the inner periphery 28 of each ring is configured to bear against and compress an outer insulative jacket 30 of the cable assembly 18. The halves 22, 24 of the rings are secured together at joint 32. A recess 34 in the outer periphery 26 of each half 22, 24 provides access to the locking member 44, discussed in detail in reference to FIGS. 4 and 5

In certain presently contemplated embodiments, half 22 and half 24 are identical to one another, and are designed such that inversion of half 24 relative to half 22 disposes mating elements in a mutually facing relation. Joining the halves, then, forms a complete protective ring 20. Certain possible arrangements for coupling together of the halves are discussed in detail in reference to FIGS. 4 and 5.

Referring to FIG. 4, half 22 of protective ring 20 is shown, according to a presently contemplated embodiment. As discussed above, half 24 is identical to half 22. Each half may be formed by any suitable process, such as injection molding using a plastic, for instance glass-reinforced nylon. Because halves 22, 24 are identical, only one injection molding die must be created for each ring produced, thereby reducing the set-up costs generally associated with manufacture of the rings. In addition, production costs are minimized because any two halves may be packaged together to form a complete ring. That is to say, it is not necessary to ensure that two different parts of a ring are packaged together because any two parts produced are sufficient to create a ring.

Half 22 includes a front face 36, and a rear face 38 arranged substantially parallel to front face 36, configured to support the structure of half 22. In addition, the junctions of the front face 36 and rear face 38 with the outer periphery 26 may be generally rounded to facilitate movement of protective ring 20 as cable assembly 18 is slid along the ground 14 in a direction generally perpendicular to faces 36, 38. Inner periphery 28 includes both protruding ribs 40 and reinforcing ribs 42. It is generally desirable that protective rings 20 remain stationary relative to cable assembly 18 as the cable assembly 18 moves across the ground 14. Accordingly, when halves 22, 24 are placed around cable assembly 18 and secured together, as discussed below, protruding ribs 40 may compress the outer insulative jacket 30 of the cable assembly 18. The protruding ribs 40 are preferably configured such that they secure protective ring 20 to the cable assembly 18 at the attachment location, thus preventing protective ring 20 from sliding along the length of cable assembly 18. Reinforcing ribs 42 are configured to support the structure of half 22. One skilled in the art will appreciate that these reinforcing ribs could also be designed to compressively secure the protective ring to a cable assembly as the protruding ribs 40 are designed to do.

FIGS. 4 and 5 illustrate an exemplary contemplated mechanism for coupling together halves 22, 24. In this embodiment, half 24 is inverted relative to half 22. A locking member 44 comprises a cam surface 46, configured to resiliently deflect locking member 44 upon insertion into engagement opening 50 past a locking surface 48. Surface 48 is configured to prevent removal of locking member 44 from engagement opening 50. Engagement opening 50 comprises an outer edge, configured to resiliently deflect locking member 44 upon contact with cam surface 46, and an abutment surface 56, configured to prevent removal of locking member 44 from engagement opening 50. Recess 34 is configured to provide access to the locking member 44.

The halves 22, 24 are assembled as follows. Upon inversion, tabs 52 are aligned with recesses 54. These tabs 52 and recesses 54 are configured to aid in proper alignment of halves 22, 24 and to provide additional support to the protective ring 20 at the joint 32. When half 22 is placed adjacent to inverted half 24, cam surface 46 comes into contact with the edge of engagement opening 50. As halves 22, 24 move together, the pressure exerted by engagement opening 50 on cam surface 46 causes locking member 44 to deflect. Once cam surface 46 moves entirely past abutment surface 56 inside engagement opening 50, locking member 44 returns to roughly its original position. Locking surface 48 then rests in contact with abutment surface 56, thereby preventing removal of locking member 44 from engagement opening 50.

Halves 22, 24 may be uncoupled by resilient deflection of locking member 44. Recess 34, accessible on outer periphery 26, is configured to allow for contact with cam surface 46. Depression of cam surface 46 may resiliently deflect locking member 44 such that locking surface 48 and abutment surface 56 are no longer in contact. By deflecting locking member 44 enough that locking surface 48 is entirely disengaged from locking surface 56, locking member 44 may be removed from engagement opening 50. Upon separation of halves 22, 24, both halves return to generally their original formations.

Referring generally to FIGS. 6-9, alternative embodiments of half 22 are shown with power cable assembly 18. These alternative embodiments of half 22 have substantially similar structural features to those discussed above. Various possible locking mechanisms are illustrated. FIG. 6 is an illustration of half 22 with a resiliently deflective locking member 44, as discussed above in reference to FIGS. 4 and 5.

FIG. 7 illustrates an alternative embodiment of the present invention, wherein halves 22, 24 are coupled together by a bolt 60 and nut 62. In this embodiment, halves 22, 24 are aligned by tabs 52 and recesses 54 as discussed above. Aperture 58 on both ends of half 22 is configured to receive bolt 60. Bolt 60 may be secured in place by nut 62.

FIG. 8 illustrates a further alternative embodiment of half 22. In this embodiment, half 22 includes a central recess 64 configured to receive a band 66. Halves 22, 24 are coupled together by band 66. Band 66 may include a worm clamp, band clamp or other roughly circular fastener, as will be appreciated by one skilled in the art.

FIG. 9 is yet another illustration of an alternative embodiment of half 22. In this embodiment, half 22 comprises a locking protrusion 68 configured to receive a roll pin 70. Halves 22, 24 are secured together when roll pin 70 is inserted into locking protrusion 68.

Figure 10:
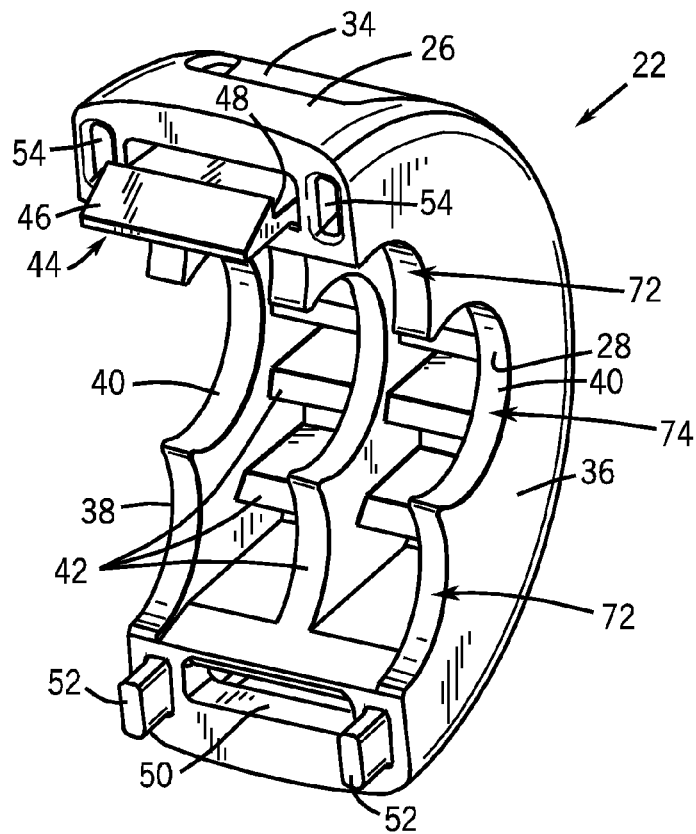
FIG. 10 is a perspective view of one segment of a further alternative protective ring, for use with multi-cable assemblies.
Figure 11:
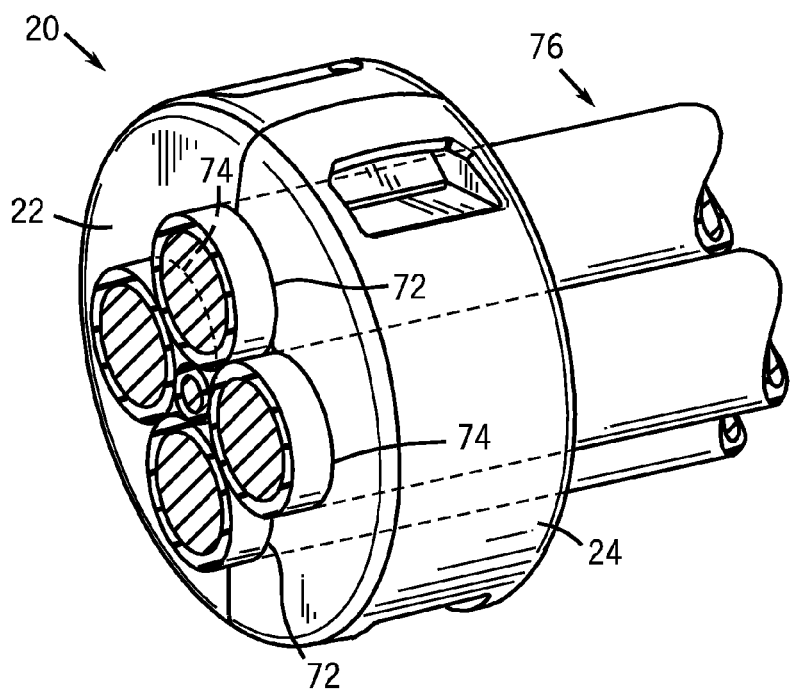
FIG. 11 is a perspective view of a segment of a bundled multi-cable power cable assembly with a protective ring of the type shown in FIG. 10.

Referring generally to FIGS. 10 and 11, a further embodiment of the present invention is shown. The outer features and locking mechanism of this embodiment are similar to those discussed in relation to the embodiment shown in FIGS. 4 and 5. In this embodiment, protective ring 20 is configured to be coupled to a bundled cable assembly 76. As those skilled in the art will appreciate, a standard bundled cable assembly 76 for supplying power to a parked aircraft 12 may comprise four individually insulated cable segments surrounding a smaller cable segment. As illustrated in FIG. 10, inner periphery 28 may have a roughly scalloped or lobed shape configured to conform to the shape of bundled cable assembly 76. The roughly scalloped shape of inner periphery 28 may include a full recess 74, configured to receive an entire segment of bundled cable assembly 76, and two partial recesses 72, each configured to receive half a segment of bundled cable assembly 76. As described above in reference to FIGS. 4 and 5, the protruding ribs 40 of inner periphery 28 may be configured to compress the insulative jackets of the segments of bundled cable assembly 76 such that protective rings 20 do not slide freely along bundled cable assembly 76. In addition, any of the locking mechanisms described above may be used to couple together halves 22, 24 according to the present embodiment.

Figure 12:
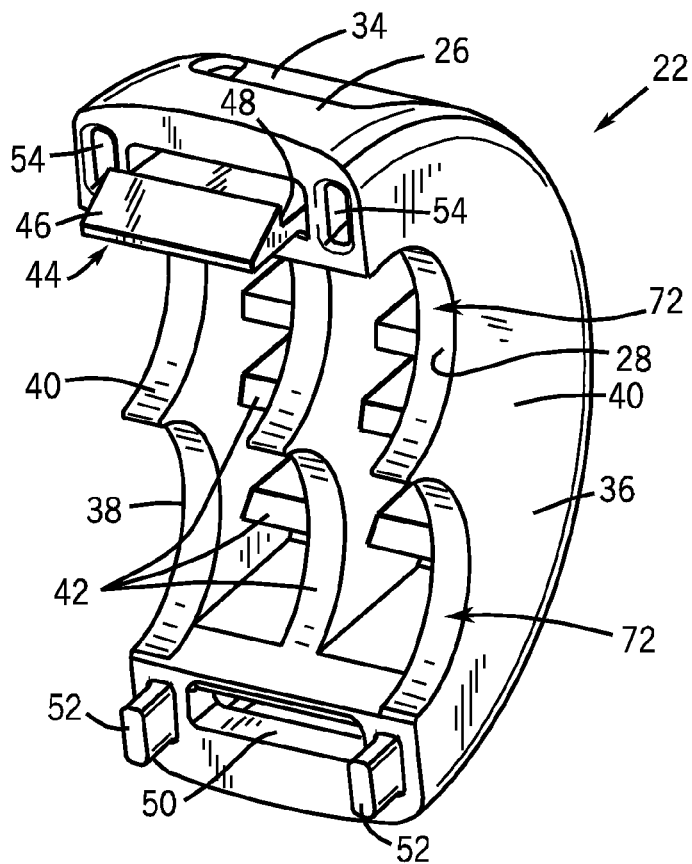
FIG. 12 is a prospective view of one segment of another alternative protective ring, similar to that of FIG. 10, but for use with a multi-cable assembly including a pair of cables.
Figure 13:
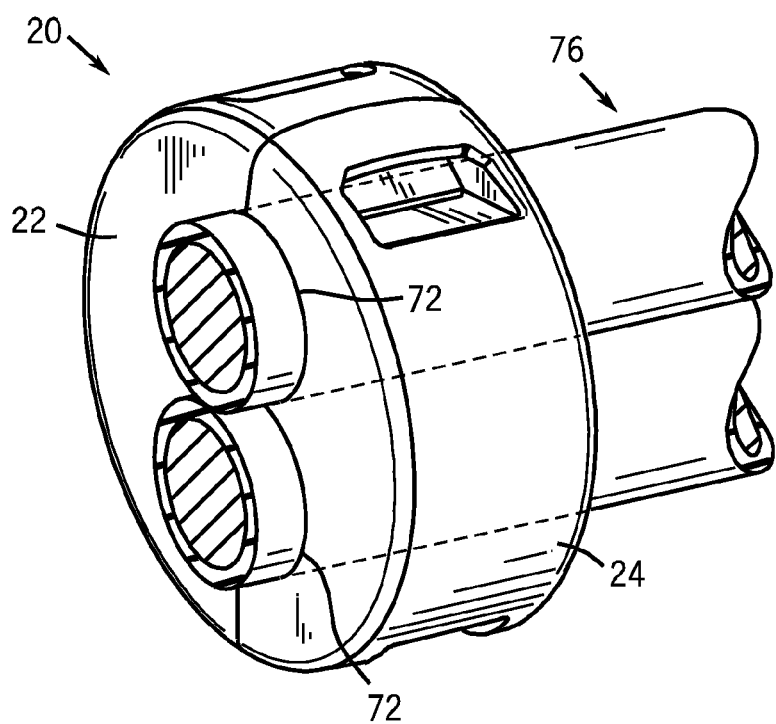
FIG. 13 is a prospective view of a segment of a bundled multi-power cable assembly installed in a protective ring of the type shown in FIG. 12.

Referring now to FIGS. 12 and 13, a different embodiment of the protective 20 is illustrated. The half-ring shown in FIG. 12 is essentially similar to that shown in FIG. 10 above. However, the ring of FIGS. 12 and 13 is intended to accommodate a two-cable bundle. Accordingly, two partial recesses 72 form the inner periphery 28 of each ring so as to contact and slightly compress the isolative jackets of the two cables located therein. Rings of the type illustrated in FIGS. 12 and 13 are particularly well-suited for cable assemblies destined for providing direct current power to applications. It should be noted that while multiple and two-cable assembly protective rings are shown in FIGS. 10, 11, 12 and 13, other configurations may certainly be envisaged that accommodate a different number of individual cables in a bundle or assembly, or that arrange the individual cables of the bundle in different patterns.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An aircraft ground power delivery system comprising:
    a power cable assembly configured to be connected between a power supply and a parked aircraft; and
    a plurality of rings, each ring having an inner periphery and an outer periphery, the inner periphery of each ring being compressively secured to an insulative jacket of the cable assembly, the outer periphery of each ring at least partially supporting the cable assembly to raise the power cable from a support surface and to facilitate sliding movement of the cable assembly over the support surface.

2. The system of claim 1, wherein the cable assembly is generally circular in cross section, and the inner periphery of each ring has a circular shape generally conforming a shape of the insulative jacket of the cable assembly, and smaller than a nominal size of an outer surface of the insulative jacket.

3. The system of claim 1, wherein the cable assembly includes a plurality of individual insulated cables bundled to form a non-circular outer shape, and wherein the inner periphery of each ring has a non-circular shape generally conforming to the outer shape of the cable assembly.

4. The system of claim 1, wherein each ring comprises a molded plastic material.

5. The system of claim 4, wherein the molded plastic material comprises glass reinforced nylon.

6. The system of claim 1, wherein each ring comprises two identical halves.

7. The system of claim 1, wherein the inner periphery of each ring has ribs for engaging the insulative jacket of the cable assembly.

8. A power cable assembly protection device comprising:
    an aircraft power cable; and
    a ring having an inner periphery and an outer periphery, the inner periphery being configured to be compressively secured to an insulative jacket of the aircraft cable, the outer periphery being configured to at least partially support the aircraft cable to raise the cable from a support surface and to facilitate sliding movement of the cable over the support surface.

9. The device of claim 8, wherein the inner periphery is generally circular.

10. The device of claim 8, wherein the inner periphery has a non-circular shape generally conforming to a non-circular outer shape of a bundled cable assembly.

11. The device of claim 8, wherein the ring comprises a molded plastic material.

12. The device of claim 11, wherein the molded plastic material comprises glass reinforced nylon.

13. The device of claim 8, wherein the inner periphery comprises protruding ribs for engaging the insulative jacket of a cable assembly.

14. The device of claim 8, wherein the inner periphery comprises reinforcing ribs.

15. The device of claim 8, wherein each ring comprises two identical halves.

16. The device of claim 15, wherein each half comprises a locking member and a corresponding engagement opening.

17. The device of claim 15, wherein each half comprises one or more alignment tabs and one or more corresponding alignment recesses.

18. The device of claim 15, wherein one half is configured to be inverted relative to another half to form a complete ring.

19. A power cable assembly protection device comprising:
    a power cable; and
    a plurality of rings secured along the cable, each ring having an inner periphery and an outer periphery, the inner periphery being configured to be compressively secured to an insulative jacket of the cable, the outer periphery being configured to at least partially support the cable to raise the cable from a support surface and to facilitate sliding movement of the cable over the support surface.

20. The assembly of claim 19, wherein each ring comprises two generally identical halves and wherein one half is configured to be inserted relative to another half to form a complete ring.

21. The assembly of claim 20, wherein each half comprises protruding ribs for engaging the insulative jacket of a cable assembly.

22. The assembly of claim 20, wherein each half comprises reinforcing ribs.

23. The assembly of claim 20, wherein each half comprises a locking member and a corresponding engagement opening.

24. The assembly of claim 23, wherein the locking member comprises a cam surface and a locking surface, and wherein the engagement opening comprises an abutment surface, the cam surface resiliently deflecting the locking member when the locking member is inserted into the engagement opening, and wherein the locking surface and the abutment surface contact one another to prevent removal of the locking member from the engagement opening.

25. The assembly of claim 24, wherein the engagement opening comprises a recess for accessing the cam surface for deflecting the locking member for removal from the engagement opening.

* * * * *